United States Patent
Iwami

(10) Patent No.: US 6,669,581 B2
(45) Date of Patent: Dec. 30, 2003

(54) WOUND-CORE GOLF BALL

(75) Inventor: Satoshi Iwami, Kobe (JP)

(73) Assignee: Sumitomo Rubber Industries Limited, Kobe (JP)

( * ) Notice: Subject to any disclaimer, the term of this patent is extended or adjusted under 35 U.S.C. 154(b) by 0 days.

(21) Appl. No.: 09/933,194

(22) Filed: Aug. 21, 2001

(65) Prior Publication Data

US 2002/0042310 A1 Apr. 11, 2002

(30) Foreign Application Priority Data

Aug. 21, 2000 (JP) ........................... 2000-250090

(51) Int. Cl.$^7$ ............................... A63B 37/06
(52) U.S. Cl. ............................... 473/363
(58) Field of Search ............... 473/356, 357, 473/361, 363, 364, 365, 371, 378

(56) References Cited

U.S. PATENT DOCUMENTS

| | | | |
|---|---|---|---|
| 3,989,568 A | 11/1976 | Isaac | |
| 4,123,061 A | 10/1978 | Dusbiber | |
| 5,334,673 A | 8/1994 | Wu | |
| 5,542,663 A | * 8/1996 | Kato et al. | 473/363 |
| 5,704,854 A | * 1/1998 | Higuchi et al. | 473/351 |
| 5,716,293 A | * 2/1998 | Yabuki et al. | 273/DIG. 22 |
| 5,816,942 A | 10/1998 | Hayashi et al. | |
| 6,190,268 B1 | * 2/2001 | Dewanjee | 473/370 |

FOREIGN PATENT DOCUMENTS

JP  9253236  9/1997

* cited by examiner

Primary Examiner—Mark S. Graham
Assistant Examiner—Raeann Gordon
(74) Attorney, Agent, or Firm—Birch, Stewart, Kolasch & Birch, LLP

(57) ABSTRACT

A wound-core golf ball having a polyurethane cover is disclosed. The polyurethane cover is formed by curing a composition comprising a tolylene diisocyanate polyurethane prepolymer and dimethylthiotoluene diamine, and exhibits superior cut resistance. The wound-core golf ball of the invention further comprises a double-layered center having a diameter of 25 to 35 mm and a rubber thread layer covering the center. The center comprises an inner core layer having a diameter of 24 to 33 mm and a JIS-A hardness of 5 to 50, and an outer core layer covering the inner core layer and having a Shore D hardness of 10 and to 60. The wound-core golf ball thus constructed imparts a good shot feeling to the golfer and offers an increased flight distance.

14 Claims, 1 Drawing Sheet

WOUND-CORE GOLF BALL

BACKGROUND OF THE INVENTION

1. Field of the Invention

The present invention relates to a wound-core golf ball having a polyurethane cover exhibiting superior cut resistance, which imparts a good shot feeling like a Balata-covered golf ball to the golfer, and an increased flight distance, and also is superior in the productivity.

2. Description of the Related Art

A wound-core golf ball is generally composed of a core, a rubber thread layer which is winding the core, and a cover material covering the rubber thread layer. Such a cover material is generally required to have a cut resistance against an impact when the golf ball is hit, particularly with an iron, or when the golf ball falls to the ground. With lower cut resistance, there arises a problem that the cover is broken or splintery by the impact. The performances of the wound-core golf ball, such as a shot feeling, a fight distance, controllability and the like, are also affected by the type of the cover material.

The wound-core golf ball with a Balata cover is widely used by high-level golfers and professional golfers, because the Balata covered golf ball provides a better shot feeling and superior controllability for the golfer. However, the Balata-covered golf ball has to be made by a complicated manufacturing process and is inferior in durability and cut resistance. For this reason, various cover materials, such as ionomer resin covers and polyurethane covers, have recently been proposed in an attempt to replace the Balata cover.

Japanese Unexamined Patent application No. H01-308577, for instance, teaches use of a cover made from a soft ionomer resin. The ionomer resin cover is inexpensive and has superior durability as compared with the Balata cover. However, it is pointed out that a golf ball with the ionomer resin cover is inferior in repulsion property and shot feeling.

U.S. Pat. Nos. 3,989,568 and 4,123,061 disclose a golf ball with a polyurethane cover comprising a polyurethane prepolymer, and a polyfunctional polyol or a diamine-type curing agent. Japanese Patent No. 2,662,909 proposes a golf ball with a polyurethane cover made by using a polyamine-type curing agent having lower reactivity with an isocyanate group, such as dimethylthiotoluene diamine. Golf balls with the polyurethane cover are known to have high impact resilience and to impart a shot feeling to the golfer as do Balata-covered golf balls.

As another approach to improve the shot feeling, controllability and the like, which are characteristic of the wound-core golf ball, various proposals have been made in relation to the internal structure of the wound-core golf ball. Japanese Unexamined Patent application Nos. H09-253236 and H09-271534, for instance, disclose a wound-core golf ball with a double-layered core.

In a process of producing a wound-core golf ball with a polyurethane cover, various problems arise depending upon the combinations of isocyanate group terminated polyurethane prepolymers and curing agents. If the combination is not proper, an increase in viscosity or gelation may occur due to a curing reaction during mixing of the polyurethane prepolymer and the curing agent. In addition, there may be a case that the desired properties of the golf ball, such as cover hardness, cut resistance and shot feeling, are not obtained.

In the case that a 4,4'-diphenylmethane diisocyanate (MDI)-type polyurethane prepolymer and dimethylthiotoluene diamine as a curing agent are used, the MDI-type polyurethane prepolymer becomes gelatinized during mixing due to its high reactivity and hence, the polyurethane cover cannot be manufactured.

Alternatively, in the case that a tolylene diisocyanate (TDI)-type polyurethane prepolymer and 3,3'-dichloro-4,4'-diaminodiphenylmethane as a curing agent are used, the resulting polyurethane cover does not exhibit good cut resistance. Furthermore, since 3,3'-dichloro-4,4'-diaminodiphenylmethane has a melting point of about 100° C. and is in a crystalline state at a room temperature, it must be melted by heating it to about 120° C. and then mixed with the isocyanate group terminated polyurethane prepolymer for the curing reaction. However, the curing reaction is accelerated by the heat of 3,3'-dichloro-4,4'-diaminodiphenylmethane, resulting in the increased viscosity and the gelation of the polyurethane prepolymer. Also, curing the polyurethane prepolymer at about 120° C. causes another problem that the rubber core is deteriorated by the heat. Thus, the golf ball will exhibit a lowered repulsion property, a bad shot feeling, or a decreased flight distance.

The inventor of the present invention has found that a polyurethane cover which is formed by curing a composition including a tolylene diisocyanate polyurethane prepolymer and dimethylthiotoluene diamine has superior cut resistance among the various combinations of the isocyanate-terminated polyurethane prepolymers and curing agents. The inventor has also found that a golf ball having excellent properties in terms of shot feeling, flight distance and the like can be obtained by employing a specific internal structure for a wound-core golf ball and has achieved the present invention.

SUMMARY OF THE INVENTION

The present invention provides a wound-core golf ball having a polyurethane cover made by curing a composition including a tolylene diisocyanate polyurethane prepolymer and dimethylthiotoluene diamine, comprising a center having a diameter of 25 to 35 mm; and a rubber thread layer covering the center, wherein the center consists of;

an inner core layer having a diameter of 24 to 33 mm and a JIS-A hardness of 5 to 50; and an outer core layer covering the inner core layer and having a Shore D hardness of 10 to 60.

Other objects, features, and attendant advantages of the present invention will become apparent from the reading of the following detailed description taken in conjunction with the attached drawing.

DETAILED DESCRIPTION OF THE PREFERRED EMBODIMENTS

Figure 1:
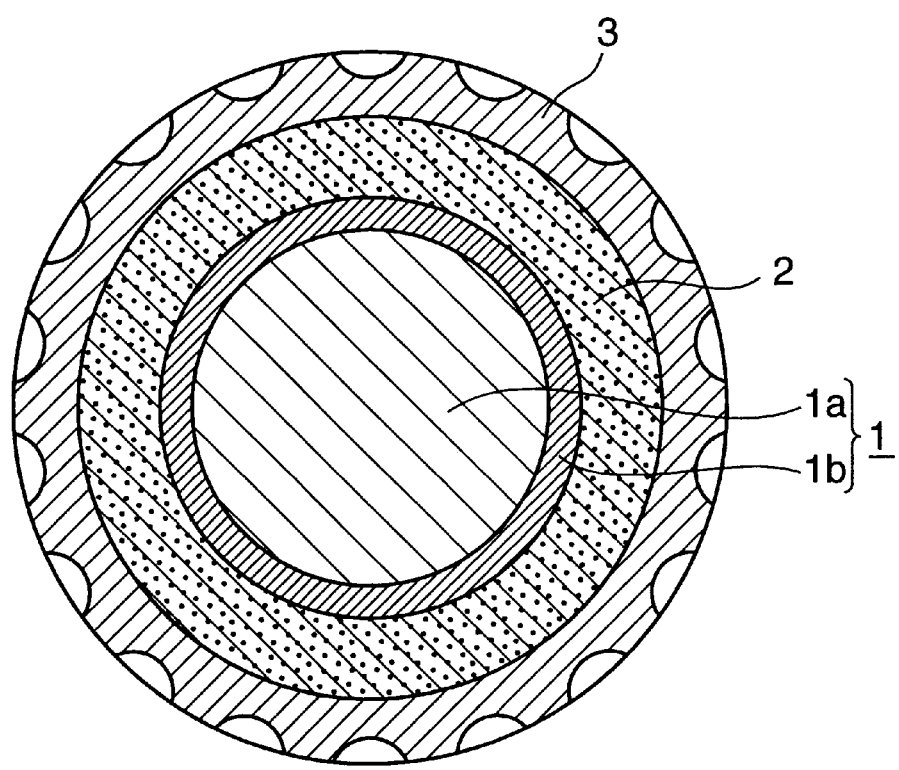
FIG. 1 is a schematic sectional view showing an example of the wound-core golf ball of the invention.

The wound-core golf ball of the present invention comprises the polyurethane cover which is formed by curing a composition including a tolylene diisocyanate polyurethane prepolymer and dimethylthiotoluene diamine (hereinafter referred to as "polyurethane cover composition"). First of all, the polyurethane cover composition is explained below.

I. Polyurethane Cover Composition

The tolylene diisocyanate polyurethane prepolymer for use in the polyurethane cover composition has at least two isocyanate groups in a polyurethane prepolymer chain, and is obtained by reacting tolylene diisocyanate with polyol so that the isocyanate group of the tolylene diisocyanate is at least a stoichiometric quantity of the hydroxyl group of the polyol in a molar ratio. In the present invention, tolylene diisocyanate may include a polyisocyanate compound containing tolylene diisocyanate as a major component. The location of each isocyanate group in a polyurethane prepolymer chain is not particularly limited, and hence the isocyanate group may be located at the terminal of the main chain or side chain of a polyurethane prepolymer chain.

The polyol for use in the polyurethane cover composition may be any polyol, as long as the polyol has a plurality of hydroxyl groups. The polyol has no limitation on its molecular weight, and may include a low-molecular-weight polyol or a high-molecular-weight polyol. Examples of low-molecular-weight polyols are diols such as ethylene glycol, diethylene glycol, triethylene glycol, 1,3-butanediol, 1,4-butanediol, neopentyl glycol, and 1,6-hexanediol; and triols such as glycerin, trimethylolpropane, and hexanetriol. Examples of high-molecular-weight polyols are polyether polyols generally obtained by the reaction between an initiator having active hydrogen and alkylene oxide; polyester polyols generally obtained by the condensation between a dibasic acid such as adipic acid, and a glycol or a triol; lactone polyester polyols generally obtained by the ring opening polymerization of a lactam such as ε-caprolactam; polycarbonate polyols generally synthesized using a cyclic diol or hexane diol; and polymer polyols such as an acrylic polyol, prepared by incorporating appropriate hydroxyl groups into an acrylic copolymer. Examples of specific polyether polyols are polyoxyethylene glycol (PEG), polyoxypropylene glycol (PPG), and polyoxytetramethylene glycol (PTMG). Examples of specific polyester polyols are polyethylene adipate (PEA), polybutylene adipate (PBA), and polyhexamethylene adipate (PHMA). An example of specific lactone polyester polyols is poly-ε-caprolactone (PCL). In view of their superior repulsive property and water resistance, polyether polyols are preferable. Among them, polyoxytetramethylene glycol is more preferable.

In the present invention, the polyurethane cover exhibiting superior cut resistance can be obtained by curing the tolylene diisocyanate polyurethane prepolymer with dimethylthiotoluene diamine represented by the following general formula (1):

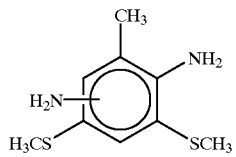

Formula(1)

The polyurethane cover composition preferably has a pot life of from 2 to 12 minutes in the range of 30° C. to 100° C. The pot life is preferably from 2 minutes to 12 minutes. If the pot life is shorter than 2 minutes, a sufficient operating time cannot be ensured. If the pot life is longer than 12 minutes, curing time becomes longer, resulting in the lower productivity.

In the present invention, the term "pot life" means a time period between the time the tolylene diisocyanate polyurethane prepolymer and dimethylthiotoluene diamine are mixed to obtain the polyurethane cover composition and the time when the viscosity of the polyurethane cover composition reaches 50,000 mPa·s (cPs) at a temperature ranging from 30° C. to 100° C. after mixing. The polyurethane cover composition preferably has the viscosity of not more than 50,000 mPa·s (cPs). If the viscosity is more than 50,000 mPa·s (cPs), the fluidity of the composition is lowered, resulting in the lowered workability.

If it is desired, the polyurethane cover composition may include a catalyst to control the pot life. For example, in the case of the pot life longer than 12 minutes, it is preferable to add the catalyst to shorten the pot life to not longer than 12 minuets. Examples of such catalysts are monoamines such as triethyl amine and N,N-dimethylcyclohexyl amine; polyamines such as N,N,',N'-tetramethylethylene diamine and N,N,N',N'',N''-pentamethyldiethylene triamine; cyclic diamines such as 1,8-diazabicyclo[5,4,0]-7-undecene (DBU) and triethylene diamine; and tin catalysts such as dibutyltin dilaurylate and dibutyltin diacetate. Among these catalysts, 1,8-diazabicyclo[5,4,0]-7-undecene (DBU) and triethylene diamine are preferable.

The polyurethane cover composition may further contain a filler such as barium sulfate, a pigment such as titanium dioxide, and other additives such as dispersant, antioxidant, ultraviolet absorber, light stabilizer, and fluorescent material or fluorescent brightner unless they impair any undesirable property to the intended golf ball. Preferably, the pigment is added in an amount of 1.0 to 6.0 parts per 100 parts of the tolylene diisocyanate polyurethane prepolymer in mass ratio.

II. Structure of the Wound-core Golf Ball

The structure of the wound-core golf ball of the present invention is described below with reference to FIG. 1. FIG. 1 is a schematic sectional view showing an example of the wound-core golf ball of the present invention. As shown in FIG. 1, the wound-core golf ball of the present invention comprises a center 1 and a rubber thread layer 2 covering the center 1, and a polyurethane cover 3 covering the rubber thread layer 2. The center 1 is further composed of an inner core layer 1a and an outer core layer 1b covering the inner core layer 1a.

The inner core layer 1a has a diameter of at least 24 mm, preferably not less than 25 mm and not more than 33 mm, preferably not more than 32 mm, more preferably not more than 31 mm. If the inner core layer 1a has the diameter less than 24 mm, the flexible features of the center are deteriorated, thus the golf ball exhibits the decreased flight distance due to the higher spin rate as well as imparts a bad shot feeling to the golfer. If the inner core layer 1a has the diameter of more than 33 mm, the rubber thread layer 2 is naturally getting thin, thus the resultant golf ball exhibits the lower repulsive property.

The inner core layer 1a has a JIS-A hardness of not more than 50, preferably not more than 45. If the inner core layer 1a has the JIS-A hardness of more than 50, the center becomes too hard, and hence the resultant golf ball tends to spin in a higher rate, resulting in a decreased flight distance. In addition, the shot feeling becomes bad. If the inner core layer 1a is too soft, it becomes difficult to mold the outer core layer 1b and to wind the rubber thread around the center 1, because the center 1 tends to be transformed easily. For this reason, the inner core layer 1a has the JIS-A hardness of not less than 5, preferably not less than 10, more preferably not less than 15, most preferably not less than 20.

The inner core layer 1a does not have any limitation on its composition, as long as the inner core layer 1a has the JIS-A hardness of from 5 to 50. Preferably, the inner core layer 1a is obtained by vulcanizing and molding a rubber composition containing an oily substance. Examples of rubber compositions for use in the inner core 1a are a butadiene rubber (BR), natural rubber (NR), ethylene-propylene-diene terpolymer (EPDM), polynorbornene or the like. It is desirable that the base rubber of the rubber composition is so highly compatible with the oily substance and allows the oily substance to be filled therein in so high proportion as to exhibit adequate impact resilience when the rubber composition forms a cross-linking structure with the oily substance homogeneously dispersed in the rubber.

Examples of oily substances are a petroleum compounding oil, a plasticizer, a rubber substitute (factice), alkylbenzene, and a liquid rubber. The petroleum compounding oil is used as a rubber extender oil. Examples of petroleum compounding oils are paraffin oils (containing 50% or more paraffinic chains) naphthenic oils (containing 30% to 45% naphthenic ring-forming carbons), and aromatic oils (containing 30% or more aromatic carbons). Examples of specific plasticizers are phthalate-type plasticizers such as dibutyl phthalate (DBP) and dioctyl phthalate (DOP); adipate-type plasticizers such as dioctyl adipate (DOA) sebacate-type plasticizers such as dioctyl sebacate (DOS): phosphate-type plasticizers such as tricresyl phosphate (TCP); and adipic acid-type polyesters. The rubber substitute is prepared by vulcanizing a vegetable oil or the like with sulfur or sulfur chloride. Examples of the rubber substitutes are a semi-translucent factice, a black factice, and a brown factice. Examples of alkylbenzene are 1-dodecyl-4-hexylbenzene, 1-dodecyl-3-hexylbenzene, and 1,2,3-hemimellitene. Examples of the liquid rubbers are liquid polybutadiene and liquid polyisoprene. These oily substances may be used individually or as a mixture of at least two of them.

Taking the compatibility of the oily substance with the rubber into consideration, the combination of the oily substance and the base rubber can be determined.

Examples of suitable combinations are a combination of polybutadiene rubber or natural rubber and a naphthenic oil or an aromatic oil, a combination of EPDM and a paraffinic oil, a combination of polynorbornene and a naphthenic oil, an aromatic oil, a plasticizer, alkylbenzene or a paraffinic oil, and a combination of a polyurethane rubber and a plasticizer or a rubber substitute. The oily substance is preferably contained in the base rubber in an amount of about 30 to 500 parts, more preferably 50 to 400 parts based on 100 parts of the base rubber. If the oily substance is contained in an amount of less than 30 parts, any improvement cannot be expected. If the oily substance is contained in an amount of more than 500 parts, some combinations do not allow the oily substance to be mixed with the rubber.

The rubber composition for use in the inner core layer 1a may further contain a filler such as barium sulfate serving as a specific gravity adjuster, a reinforcing agent such as hydrous silicic acid or carbon black, a processing aid serving as a tackifier, an antioxidant, and the like in addition to the base rubber and the oily substance. Further, the rubber composition may include, to be described later, a polystyrene elastomer, a polyethylene elastomer, a polyurethane elastomer or the like. The inner core layer 1a, for example, can be obtained by kneading the rubber composition and vulcanizing and molding it in a mold at 150° C. to 170° C. for 10 to 20 minutes.

The outer core layer 1b of the present invention has a Shore D hardness of not more than 60, preferably not more than 55 in a state of covering the inner core layer 1a. If the outer core layer 1b has the Shore D hardness of more than 60, the center becomes too hard. The excessively hard center tends to spin the resultant golf ball in a higher rate, resulting in a decreased flight distance. In addition, the shot feeling becomes bad. If the outer core layer 1b is too soft, the resultant golf ball is likely to exhibit a lowered repulsive property. For this reason, the outer core layer 1b has the JIS-A hardness of at least 55 or a Shore D hardness of at least 10, preferably a Shore D hardness of at least 15. With respect to the relation between the inner core layer 1a and the outer core layer 1b in terms of hardness, the outer core layer 1b may become softer than the inner core layer 1a as long as their respective hardness values are within the aforementioned respective hardness ranges. However, the respective hardness values of the inner core layer 1a and the outer core layer 1b in JIS-A hardness preferably satisfy the following relationship to achieve both of a high repulsive property and a good shot feeling.

(Outer core layer hardness−Inner core layer hardness)≧10(in JIS-A hardness)

The outer core layer 1b has no limitation on its raw material so long as the hardness of the outer core layer 1b is within the foregoing range. Examples of the raw material for use in the outer core layer 1b are thermoplastic resins such as polyurethane resin, ionomer resin, nylon, and polyethylene; and thermoplastic elastomers containing a soft segment portion and a hard segment portion in a molecule thereof, thereby developing rubber elasticity. The thermoplastic elastomers are preferably used in the present invention. The thermoplastic elastomer, for example, without limitation, includes at least one elastomer selected from the group consisting of a polystyrene elastomer, a polyolefin elastomer, a polyurethane elastomer, and a polyester elastomer. Use of a polyester elastomer is more preferable in order to prevent the oily substance from bleeding out of the inner core layer 1a.

Examples of commercial products of the polystyrene elastomers are "ESBS A1010" produced by DAISERU KAGAKUKOGYOU KABUSHIKI KAISHA, and "SEPTON HG-252" produced by KABUSHIKI KAISHA KURARE. Examples of commercial products of the polyolefin elastomers are "MILASTOMER M4800NW" produced by MITSUI KAGAKUKOGYO KABUSHIKI KAISHA, and "SUMITOMO TPE3682" and "SUMITOMO TPE9455" produced by SUMITOMO KAGAKUKOGYO KABUSHIKI KAISHA. Examples of commercial products of the polyurethane elastomers are "KURAMIRON 9195" and "KURAMIRON 9180" produced by KABUSHIKI KAISHA KURARE, and "ELASTOLLAN ET680" produced by BASF POLYURETHANE ELASTOMERS KABUSHIKI KAISHA. Examples of commercial products of the polyester elastomers are "HYTREL 3548", "HYTREL 4047", "HYTREL 4767" and "HYTREL 5557" produced by TORAY-DUPONT KABUSHIKI KAISHA.

The outer core layer 1b may further contain a specific gravity adjustor such as barium sulfate or tungsten, in addition to the aforementioned thermoplastic resin or thermoplastic elastomer. The thermoplastic resin and/or thermoplastic elastomer are contained in the outer core layer 1b in an amount of not less than 50 mass %, preferably not less than 80 mass %, more preferably not less than 90 mass % mass % with respect to the total mass of the outer core layer 1b.

The outer core layer 1b can be formed by a process typically employed to form a golf ball cover. For example, the composition of the outer core layer 1b is formed into the shape of a hemispherical half shell to obtain two half shells, and the inner core layer 1a is wrapped with the two half shells, followed by pressure molding to obtain the center 1.

Alternatively, it is possible to injection-mold the composition of the outer core layer 1b directly onto the inner core layer 1a to wrap the inner core layer 1a therein. In this way, the outer core layer having a thickness of 0.5 to 9 mm is formed on the inner core layer 1a to obtain the center 1. The center 1 has a diameter of at least 25 mm, preferably at least 26 mm and not more than 35 mm, preferably not more than 32 mm. If the diameter of the center 1 is less than 25 mm, the resultant golf ball exhibits a decreased flight distance because of spinning in a higher rate. On the other hand, if the diameter is more than 35 mm, the rubber thread layer becomes thinner, and hence the resulting golf ball exhibits a lowered repulsive property.

The obtained center 1 is wound with the rubber thread used for golf balls to form a wound core comprising the center 1 and the rubber thread layer 2. As the rubber thread, it is possible to use typical materials conventionally used as rubber threads for golf balls.

An example of such a material is a rubber thread obtained by vulcanizing a rubber composition which comprises natural rubber or a mixture of natural rubber and a synthetic isoprene, sulfur, a vulcanization assistant, a vulcanization accelerator, an antioxidant and the like. The rubber thread layer 2 can be formed by a conventional process employed to form a wound core. The thickness of the rubber thread layer 2 is at least 1.5 mm, preferably at least 2.0 mm, and not more than 7.5 mm, preferably not more than 7.0 mm. If the thickness of the layer 2 is less than 1.5 mm, the repulsive property of the rubber thread is not sufficiently utilized. If the thickness of the layer 2 is more than 7.5 mm, the resultant golf ball tends to spin in a higher rate and draw a blown-up trajectory, resulting in a decreased flight distance.

The wound-core golf ball of the invention is, for example, without limitation, manufactured by coating the wound core with the foregoing polyurethane cover composition and allowing the composition to cure. The polyurethane cover composition can be mixed by a typical mixer for use in the mixing of a polyurethane prepolymer, for example, a two-part resin mixing dispenser. The mixing is preferably conducted at the temperature of not higher than 100° C., more preferably not higher than 80° C. and not lower than 10° C., more preferably not lower than 30° C. In the case that mixing is conducted at the temperature of higher than 100° C., highly toxic vapor generates from the tolylene diisocyanate polyurethane prepolymer and pollutes the working atmosphere, and an increase in viscosity or gelation is likely to occur due to the curing reaction proceeding during the mixing. Further, the working operation at a lower temperature is preferred in view of safety. In the case that mixing is conducted at the temperature of lower than 10° C., the viscosity of the tolylene diisocyanate polyurethane prepolymer becomes too high, and hence it is difficult to disperse the curing agent into the tolylene diisocyanate polyurethane prepolymer homogeneously.

Subsequently, the polyurethane cover composition is injected into a hemispherical mold holding the wound core therein, and then the mold is inverted and mated with another hemispherical mold into which the polyurethane cover composition has been injected, followed by curing.

The curing reaction is preferably conducted at 120° C. or lower, more preferably at 100° C. or lower. If the curing reaction is conducted at the temperature of higher than 120° C., the rubber thread layer is deteriorated by heat, resulting in the poor repulsive property.

If the repulsive property of the rubber thread layer is lowered, the resultant golf ball exhibits a bad shot feeling in spite of having a polyurethane cover. According to the present invention, use of dimethylthiotoluene diamine enables to lower the curing temperature as low as about 80° C., thus the wound-core golf ball which exhibits a satisfactory repulsive property and a good shot feeling without deteriorating its rubber thread layer is obtained.

The curing time is suitably adjusted in accordance with the curing temperature. When the curing temperature is within the range between 60° C. and 120° C., the curing can be conducted for not longer than 30 minutes, preferably not longer than 15 minutes.

If it is desired, the surface of the polyurethane cover is formed with a multiplicity of dimples during the molding of the cover. Further, the golf ball is usually provided with paint finish, a marking stamp and the like to enhance the appearance and commercial value thereof before it is put on the market.

It is noted that the cover of the golf ball of the present invention may comprise a single layer or plural layers.

EXAMPLES

The following examples illustrate the present invention, however these examples are intended to illustrate the invention and are not to be construed to limit the scope of the invention. Many variations and modifications of such examples will exist without departing from the scope of the inventions. Such variations and modifications are intended to be within the scope of the invention.

Evaluation Method

1. Measurement of Hardness

The hardness of the inner core layer 1a was measured by bringing a spring type hardness tester A prescribed by JIS-K6301 into contact with the surface of the inner core 1a in a ball state.

The hardness of the outer core layer 1b and the cover were measured by a spring type hardness tester D prescribed by ASTM-D2240 by bringing the hardness tester into contact with the outer core layer 1b in a state covering the inner core layer 1a or with the cover 3 in a state covering the wound core.

The slab hardness of the polyurethane cover composition was determined according to ASTM-D2240. The polyurethane cover composition was formed into a sheet having a thickness of about 2 mm with a hot mold press and then the sheet was stored at 23° C. for 2 weeks. The slab hardness of the sheet was measured by stacking three or more sheets one upon another.

2. Measurement of Tear Strength

According to JIS-K6252, a hot press-molded sheet having a thickness of about 2 mm was made from the polyurethane cover composition and stored at 23° C. for 2 weeks, then an angle type test piece was punched out of the sheet. The tear strength of the test piece was measured at the head speed of 500 mm/min. Each value of tear strength was reduced to an index number relative to the value obtained in Example 1 (cover composition I) being assumed 100. A larger index number indicates a higher tear strength and hence is more preferable. An index number smaller than 100 means an insufficient tear strength and hence is not good.

3. Chunking Resistance Upon Iron Shot

A golf ball was hit using a commercially available pitching wedge attached to a swing robot manufactured by TRUE TEMPER CO. at the head speed of 37 m/sec. Each of the three portions of the golf ball was hit once and evaluated by observing the condition according to the following criteria:

"Good": A ball surface has few flaws left, or flaws are in an unnoticeable degree, if any.

"Fair": A ball surface has clearly noticeable flaws and is slight napped.

"Bad": A ball surface has considerably shaved and is conspicuously napped.

4. Flying Performance of the Golf Ball

A golf ball was hit with a wood club #1 (W#1) attached to a swing robot manufactured by TRUE TEMPER CO. at the head speed of 45 m/sec.

4-1) Rate of Spins(rpm)

The rate of spins of a golf ball was determined by taking a serial photograph of the golf ball hit.

4-2) Flight Distance

A distance to the point at which a golf ball fell to the ground was measured.

4-3) Initial Golf Ball Speed

The initial speed of a golf ball hit was measured.

5. Shot Feeling

The shot feeling of a golf ball was evaluated by ten top-level professional golfers in an actual hitting test based on the following criteria. The largest number of the criteria level was determined as the result of the evaluation for a golf ball.

Criteria:

"Good": A golf ball gives a small impact and imparts a sensation of sufficient repulsion.

"Fair": A golf ball gives a somewhat large impact or imparts a sensation of somewhat insufficient repulsion.

"Poor": A golf ball gives a large impact or imparts a sensation of unappreciable repulsion or of heaviness.

6. Measurement of the Pot Life

A tolylene diisocyanate polyurethane prepolymer and a curing agent were set to predetermined temperatures and then mixed together. The time period required for the viscosity of the mixture to reach 50,000 mPa·s (cPs) at the mixing temperature was measured.

Manufacture of Golf Ball

1. Manufacture of the Inner Core Layer 1a

According to the formulation shown in Table 1, each rubber composition for the inner core layer 1a was kneaded and then pressed in a mold at 160° C. for 15 minutes in order to form the inner core layer 1a.

TABLE 1

Formulation of the inner core 1a

| Raw materials | | A | B | C | D | E |
|---|---|---|---|---|---|---|
| Norsorex | *1) | 100 | — | 100 | 100 | — |
| Alkylbenzen oil | *2) | 200 | — | 300 | 150 | — |
| BR11 | *3) | — | 100 | — | — | 100 |
| Nippol 2007J | *4) | — | — | — | — | 30 |
| Zinc oxide | | 5 | 5 | 5 | 5 | 5 |
| Stearic acid | | 1 | 2 | 1 | 1 | 2 |
| Sulfur | | 2.5 | 10 | 2.5 | 2.5 | 10 |
| Barium sulfate | | 240 | 75 | 370 | 220 | 80 |
| Nocceller ZTC | *5) | 3 | — | 3 | 3 | 1 |
| Nocceller DM | *6) | 2 | — | 2 | 2 | — |
| Nocceller CZ | *7) | — | 1.5 | — | — | 0.25 |
| Nocceller TT | *8) | — | 0.2 | — | — | — |
| JIS-A-hardness | | 30 | 75 | 20 | 40 | 55 |

Unit: parts
Notes on table 1:
*1) Polynorbornene rubber produced by NIHON ZEON KABUSHIKI KAISHA;
*2) Alkylbenzene oil produced by NIHON ZEON KABUSHIKI KAISHA;
*3) High-cis-polybutadiene rubber produced by JSR KABUSHIKI KAISHA;
*4) High-styrene resin produced by NIHON ZEON KABUSHIKI KAISHA;
*5) Vulcanization accelerator (zinc dibenzyldithiocarbamate) produced by OOUCHI SHINKOKACAKUKOGYO KABUSHIKI KAISHA;
*6) Vulcanization accelerator (dibenzothiazyl disulfide) produced by OOUCHI SHINKOKAGAKUKOGYO KABUSHIKI KAISHA;
*7) Vulcanization accelerator (N-cyclohexyl-2-benzothiazylsulfenamide) produced by OOUCHI SHINKOKAGAKUKOGYO KABUSHIKI KAISHA; and
*8) Vulcanization accelerator (tetramethylthiuram disulfide) produced by OOUCHI SHINKOKAGAKUKOGYO KABUSHIKI KAISHA.

2. Manufacture of the Center 1

According to the formulation shown in Table 2, each composition for outer core layer 1b was injection molded directly onto the inner core layer 1a to obtain a center 1.

TABLE 2

Formulation of the outer inner core 1b

| Raw materials | Brevity code | Shore D hardness |
|---|---|---|
| Hytrel 4047 *9) | a | 40 |
| Hytrel 4767 *9) | b | 47 |
| Elastollan ET680 *10) | c | 25 |
| Toughprene 315 *11) | d | 15 |
| Hytrel 5557 *9) | e | 55 |
| Surlyn 9320W *12) | f | 40 |
| Sumitomo TPE3572 *13) | g | below 10 *) |
| Hytrel 6347 *9) | h | 63 |

*) Shore A hardness of 47
Notes on Table 2:
*9) Polyester-type thermoplastic elastomer produced by TORAY-DUPONT KABUSHIKI KAISHA;
*10) Polyurethane-type thermoplastic elastomer produced by BASF POLYURETHANE ELASTOMER KABUSHIKI KAISHA;
*11) Polystyrene-type thermoplastic elastomer produced by ASAHI KASEI KOGYO;
*12) Zinc-neutralized ethylene-methacrylic acid-n-butyl acrylate three-component ionomer resin produced by DUPONT CO.; and
*13) Olefin-type thermoplastic elastomer produced by SUMITOMO KAGAKU KABUSHIKI KAISHA.

3. Manufacture of Wound Core

Rubber thread made from a blended rubber comprising a base rubber of natural rubber/low-cis-isoprene rubber ("SHELL IR-309" produced by SHELL KAGAKU Co.) having a mass ratio of 50/50 was wound around the aforementioned center, to form a wound core having an outer diameter of about 39.6 mm.

4. Manufacture of Cover

According to the formulation shown in Table 3, a tolylene diisocyanate polyurethane prepolymer and a curing agent were set to the predetermined temperatures and then mixed together. The mixture was injected into a hemispherical mold holding the wound core therein, and then this mold was inverted and mated with another hemispherical mold containing the mixture injected therein, followed by press molding and curing the mixture. The curing conditions were also shown in Table 3.

TABLE 3

Formulation of cover

| Raw materials | I | II | III | IV | V | VI |
|---|---|---|---|---|---|---|
| Prepolymer | | | | | | |
| Adiprene L100 | 100 | — | — | — | — | — |
| Adiprene LF-950A | — | 100 | — | 100 | — | — |
| Adiprene L-83 | — | — | 100 | — | — | — |
| Adiprene LF-700D | — | — | — | — | 100 | — |
| Curing agent | | | | | | |
| Ethacure 300 | 9.8 | 14.4 | — | — | — | — |
| Iharacuamine MT | — | — | 10.0 | 18.5 | 25.4 | — |
| Titanium dioxide | 2 | 2 | 2 | 2 | 2 | 2 |
| Ionomer resin | | | | | | |
| Himilan 1855 | — | — | — | — | — | 50 |
| Himilan 1555 | — | — | — | — | — | 20 |
| Surlyn 6320 | — | — | — | — | — | 30 |
| Mixing condition | | | | | | |
| Temp. of Prepolymer | 70 | 70 | 80 | 80 | 80 | — |
| Temp. of Curing agent (° C.) | 30 | 30 | 120 | 120 | 120 | — |
| Pot life (mins.) | 6.5 | 5.0 | 11.5 | 9.0 | 6.0 | — |
| Curing condition | | | | | | |
| Curing temperature (° C.) | 80 | 80 | 120 | 120 | 120 | 150 |

TABLE 3-continued

Formulation of cover

| Raw materials | I | II | III | IV | V | VI |
|---|---|---|---|---|---|---|
| Curing time (mins.) | 10 | 10 | 15 | 10 | 5 | 5 |
| Slab hardness (Shore D) | 40 | 53 | 35 | 53 | 70 | 53 |

Unit: parts
Notes on table 3
ADIPRENE L100: TDI/PTMG-type isocyanate group terminated polyurethane prepolymer having an NCO content of 4.1% produced by UNIROYAL CO.
ADIPRENE LF-950A: TDI/PTMG-type polyurethane prepolymer having an NCO content of 6.04% produced by UNIROYAL CO.
ADIPRENE L-83: TDI/PTMG-type polyurethane prepolymer having an NCO content of 3.25% produced by UNIROYAL CO.
ADIPRENE LF-700D: TDI/PTMG-type polyurethane prepolymer having an NCO content of 8.3% produced by UNIROYAL CO.
ETHACURE 300: Mixture of 2,4-dimethylthiotoluene diamine and 2,6-dimethylthiotoluene diamine produced by ETHYL CO.
IHARACUAMIN MT: 3,3'-dichloro-4,4'-diaminodiphenylmethane produced by IHARA CHEMICAL KOGYO KABUSHIKI KAISHA
HIMILAN 1855: zinc ion-neutralized ethylene-methacrylic acid-butyl acrylate ionomer resin.
HIMILAN 1555: zinc ion-neutralized ethylene-methacrylic acid ionomer resin.
SURLYN 6320: magnesium ion-neutralized ethylene-methacrylic acid-butyl acrylate ionomer resin.

The ionomer resin cover formed from cover composition VI was manufactured by the following process HIMILAN 1855, HIMILAN 1555 and SURLYN 6320 are mixed using a twin-screw kneading extruder to obtain the cover composition in the form of pellet. The extrusion was conducted in the following conditions:
screw diameter=45 mm,
screw revolutions=200 rpm,
screw L/D=35, and
the cover composition was heated to from 200° C to 260° C. at the die position of the extruder. The cover composition thus prepared was molded into a hemispherical half shell, and the wound core was wrapped with the two half shells, followed by press compression molding at 150° C.

5. Manufacture of Ball

The ball thus molded was removed from the molds, deburred, and then coated with a white paint and a clear paint, to obtain a wound-core golf ball having a diameter of 42.8 mm and a mass of 45.4 g.

Performances of the Golf Ball

According to the measurement and evaluation methods described above, the inner core layer 1a and the outer core layer 1b were measured in terms of their respective hardness and diameter, and the hardness of the cover was measured. The physical properties of the wound-core golf ball thus obtained were also determined. The results of the measurements are shown in Tables 4 and 5. Table 4 showed the examples of the present invention and Table 5 showed the comparative examples.

TABLE 4

Structure and Properties of Golf ball

| | Examples | | | | | | | | | | | |
|---|---|---|---|---|---|---|---|---|---|---|---|---|
| Golf ball structure | 1 | 2 | 3 | 4 | 5 | 6 | 7 | 8 | 9 | 10 | 11 | 12 |
| Inner core | | | | | | | | | | | | |
| formulation | A | A | A | A | A | A | A | C | D | A | A | A |
| diameter (mm) | 29.5 | 27.5 | 25.5 | 27.5 | 27.5 | 27.5 | 24 | 27.5 | 27.5 | 27.5 | 27.5 | 27.5 |
| JIS-A-hardness | 30 | 30 | 30 | 30 | 30 | 30 | 30 | 20 | 40 | 30 | 30 | 30 |
| Outer core | | | | | | | | | | | | |
| formulation | a | a | a | a | b | c | a | a | a | d | e | f |
| Shore-D-hardness | 40 | 40 | 40 | 40 | 47 | 25 | 40 | 40 | 40 | 15 | 55 | 40 |
| Center diameter (mm) | 33.5 | 31.5 | 29.5 | 31.5 | 31.5 | 31.5 | 28 | 31.5 | 31.5 | 31.5 | 31.5 | 31.5 |
| Cover | | | | | | | | | | | | |
| formulation | I | I | I | II | II | II | I | II | II | II | II | II |
| Shore-D-hardness | 45 | 45 | 45 | 58 | 58 | 58 | 45 | 58 | 58 | 58 | 58 | 58 |
| Properties of golf ball | | | | | | | | | | | | |
| Tear strength | 100 | 100 | 100 | 120 | 120 | 120 | 100 | 120 | 120 | 120 | 120 | 120 |
| Chunking | good | good | good | good | good | good | good | good | good | good | good | good |
| Flight performance | | | | | | | | | | | | |
| Initial speed (m/s) | 64.0 | 64.1 | 64.2 | 65.0 | 64.6 | 64.7 | 64.4 | 65.2 | 64.8 | 64.5 | 64.8 | 64.3 |
| Spin rate (rpm) | 2900 | 2950 | 2970 | 2700 | 2800 | 2750 | 2980 | 2600 | 2800 | 2600 | 2850 | 2650 |
| Distance (yards) | 221.5 | 221.8 | 221.9 | 223.0 | 222.7 | 222.8 | 222.1 | 223.3 | 222.8 | 222.6 | 222.8 | 222.2 |
| Shot feeling | good | good | good | good | good | good | good | good | good | good | good | good |

As seen from Table 4, each of the wound-core golf balls of the present invention exhibited an increased flight distance and gave a good shot feeling to the golfer. Further, the polyurethane cover materials of the present invention were excellent in cut resistance (tear strength and chunking) and the like, and this fact indicates that the golf ball of the present invention has high durability.

TABLE 5

Structure and Properties of Golf ball

Comparative Examples

| Golf ball structure | 1 | 2 | 3 | 4 | 5 | 6 | 7 | 8 | 9 | 10 | 11 | 12 | 13 |
|---|---|---|---|---|---|---|---|---|---|---|---|---|---|
| Inner core | | | | | | | | | | | | | |
| formulation | B | B | E | A | A | A | A | A | A | A | A | B | B |
| diameter (mm) | 27.5 | 27.5 | 27.5 | 27.5 | 27.5 | 27.5 | 27.5 | 27.5 | 20 | 35 | 27.5 | 27.5 | single core |
| JIS-A-hardness | 75 | 75 | 55 | 30 | 30 | 30 | 30 | 30 | 30 | 30 | 30 | 75 | |
| Outer core | | | | | | | | | | | | | |
| formulation | a | b | a | g | h | a | a | a | a | a | a | a | |
| Shore-D-hardness | 40 | 40 | 40 | below 10 | 63 | 40 | 40 | 40 | 40 | 40 | 40 | 40 | |
| Center diameter (mm) | 31.5 | 31.5 | 31.5 | 31.5 | 31.5 | 31.5 | 31.5 | 31.5 | 24 | 39 | 31.5 | 31.5 | 31.5 |
| Cover | | | | | | | | | | | | | |
| formulation | II | II | II | II | II | III | IV | V | II | II | VI | VI | II |
| Shore-D-hardness | 58 | 58 | 58 | 58 | 58 | 35 | 58 | 70 | 58 | 58 | 58 | 58 | 58 |
| Properties of golf ball | 120 | 120 | 120 | 120 | 120 | 60 | 100 | 90 | 120 | 120 | 80 | 80 | 120 |
| Tear strength Chunking | good | good | good | good | good | bad | fair | fair | good | good | bad | bad | good |
| Flight performance | | | | | | | | | | | | | |
| Initial speed (m/s) | 63.8 | 63.6 | 63.6 | 63.5 | 64.0 | 63.1 | 64.2 | 64.8 | 65.3 | 63.8 | 63.6 | 63.4 | 63.3 |
| Spin rate (rpm) | 2850 | 2900 | 2750 | 2550 | 3050 | 3200 | 2700 | 2400 | 3000 | 2500 | 3000 | 3100 | 2900 |
| Distance (yards) | 221.2 | 220.0 | 221.5 | 220.0 | 219.4 | 218.1 | 221.4 | 223.1 | 221.2 | 221.4 | 219.8 | 219.0 | 220.3 |
| Shot feeling | bad | bad | fair | bad | bad | bad | bad | bad | bad | bad | bad | bad | bad |

The golf balls of Comparative Examples 1 to 3 exhibited a bad shot feeling and a decreased flight distance, although the polyurethane cover material exhibited superior cut resistance. This is because the inner core layer 1a of each golf ball of Comparative Examples 1 to 3 had a hardness of larger than 50, and hence the center incorporating the inner core layer 1a was too hard, resulting in lowered repulsive property.

The outer core layers 1b of Comparative Examples 4 and 5 had a Shore D hardness of less than 10 and a Shore D hardness of 63, respectively.

The golf balls of the Comparative Examples 4 and 5 exhibited a bad shot feeling. This is because the repulsive property is lowered due to too soft or too hard center. Furthermore, in the comparative Example 5, since the outer core layer hardness (hardness of the center) was too high, the rate of spins of the golf ball increased, resulting in a decreased flight distance.

The covers of Comparative Examples 6 and 8 had a Shore D hardness of 35 and a Shore D hardness of 70, respectively. The golf balls of the Comparative Examples 6 and 8 exhibited a bad shot feeling. This is because the repulsive property was lowered due to too soft or too hard cover. Furthermore, in the case of too soft cover of Comparative Example 6, the rate of spins of the golf ball increased, resulting in a decreased flight distance.

In Comparative Examples 6 to 8, 3,3'-dichloro-4,4'-diaminodiphenylmethane was used as the curing agent, thus the curing temperature was required to be as high as 120° C. and such a high curing temperature caused to deteriorate the rubber thread layer by heat, thus resulting in a bad shot feeling. Further, in these Comparative Examples, the cut resistance of the cover material was lowered in terms of tear strength, chunking, and the like.

In Comparative Example 9, the diameter of the inner core layer 1a and that of the center 1 were both smaller, thus the rubber thread layer became thicker. The thicker rubber thread layer enhanced the repulsive property, and increased the rate of spins of the golf ball. As a result, the flight distance of the Comparative example 9 was decreased.

In Comparative Example 10, the diameter of the inner core layer 1a and that of the center 1 were both larger, thus the rubber thread layer became thinner. The thinner rubber thread layer caused to lower the repulsive property of the golf ball. As a result, the shot feeling became bad.

Comparative Examples 11 and 12 each used an inomoner resin cover which require a higher molding temperature. Such a high molding temperature caused to deteriorate the rubber thread layer 2 by heat, resulting in a bad shot feeling. Further, the golf balls of the Comparative Examples 11 and 12 exhibited lowered cut resistance in terms of tear strength, chunking and the like.

Comparative Example 13 was a golf ball having a single-layered core. This golf ball exhibited a lower repulsive property than a double-layered core golf ball and hence imparted a bad shot feeling.

As can be clearly understood from Table 5, a golf ball that does not meet any one of the requirements of the present invention cannot exhibit well-balanced properties in terms of cut resistance, shot feeling, flight distance and the like.

The wound-core golf ball of the present invention has the polyurethane cover having superior cut resistance and also exhibits superior properties in terms of shot feeling, flight distance and the like. Since the polyurethane cover composition has a pot life from 2 to 12 minutes in molding the polyurethane cover, there arises no manufacturing problem such as gelation or a prolonged curing time, and hence the golf ball of the present invention can be manufactured efficiently.

This application is based on Japanese Patent application No.2000-250090 filed on Aug. 21, 2000, the contents of which are hereby incorporated by reference.

What is claimed is:

1. A wound-core golf ball having a polyurethane cover made by curing a composition containing a polyurethane prepolymer and dimethylthiotoluene-diamine, wherein all of the polyurethane prepolymer contained in the composition consists essentially of tolylenediisocyanate polyurethane prepolymer, and said ball further comprises:

a center having a diameter of 25 to 35 mm; and a rubber thread layer covering the center, wherein the center consists essentially of:
an inner core layer having a diameter of 24 to 33 mm and a JIS-A hardness of 5 to 50; and
an outer core layer covering the inner core layer and having a Shore D hardness of 10 to 60.

2. The wound-core golf ball according to claim 1, wherein the tolylene diisocyanate polyurethane prepolymer is prepared by reacting tolylene diisocyanate and polyether polyol.

3. The wound-core golf ball according to claim 1, wherein the outer core layer is made from at least one thermoplastics elastomer selected from the group consisting of a polyurethane elastomer, a polyester elastomer, a polyolefin elastomer, and a polystyrene elastomer.

4. The wound-core golf ball according to claim 1, wherein the composition has a pot life such that time for a viscosity of the composition in the range of 30° C. to 100° C. to reach up to 50,000 mpa·s (cPs) is from 2 to 12 minutes.

5. The wound-core golf ball according to claim 1, wherein the center has the diameter of 26 to 32 mm.

6. The wound-core golf ball according to claim 1, wherein the inner core has the diameter of 25 to 31 mm and the JIS-A hardness of 20 to 45.

7. The wound-core golf ball according to claim 1, wherein the outer core has the Shore D hardness of 15 to 55.

8. The wound-core golf ball according to claim 1, wherein the outer core layer and the inner core layer satisfy the following equation in terms of JIS-A hardness:

(Outer core layer hardness−Inner core layer hardness)≧10.

9. The wound-core golf ball according to claim 1, wherein
the tolylene diisocyanate polyurethane prepolymer is prepared by reacting tolylene diisocyanate and polyoxytetramethylene glycol; and the outer core layer includes a polyester elastomer.

10. The wound-core golf ball according to claim 9, wherein the composition has a pot life such that time for a viscosity of the composition in the range of 30° C. to 100° C. to reach up to 50,000 mpa·s (cPs) is from 2 to 12 minutes.

11. A wound-core golf ball having a polyurethane cover made by curing a composition containing a polyurethane prepolymer and dimethylthiotoluene diamine at the temperature of 60 to 100° C., wherein all of the polyurethane prepolymer contained in the composition consists essentially of tolylenediisocyanate polyurethane prepolymer, and said ball further comprises:

a center having a diameter of 26 to 32 mm; and a rubber thread layer covering the center, wherein the center consists essentially of;
an inner core layer having a diameter of 25 to 31 mm and a JIS-A hardness of 20 to 45; and
an outer core layer covering the inner core layer and having a Shore D hardness of 15 to 55.

12. The wound-core golf ball according to claim 11, wherein
the tolylene diisocyanate polyurethane prepolymer is prepared by reacting tolylene diisocyanate and polyoxytetramethylene glycol; and the outer core layer includes a polyester elastomer.

13. The wound-core golf ball according to claim 12, wherein the composition has a pot life such that time for a viscosity of the composition in the range of 30° C. to 100° C. to reach up to 50,000 mPa·s (cPs) is from 2 to 12 minutes.

14. The wound-core golf ball according to claim 13, wherein the outer core layer and the inner core layer satisfy the following equation in terms of JIS-A hardness:

(Outer core layer hardness−Inner core layer hardness)≧10.

* * * * *